UNITED STATES PATENT OFFICE.

HUGO SCHWEITZER, OF NEW YORK, N. Y., ASSIGNOR TO HIMSELF AND EDWARD N. DICKERSON, OF SAME PLACE.

PROCESS OF EXTRACTING TANNIN.

SPECIFICATION forming part of Letters Patent No. 531,752, dated January 1, 1895.

Application filed August 18, 1894. Serial No. 520,725. (No specimens.)

*To all whom it may concern:*

Be it known that I, HUGO SCHWEITZER, of the city, county, and State of New York, have invented a new and useful Process of Extracting Tannin, of which the following is a full, true, and exact description.

My invention permits the production of a very pure tannin in a very cheap way, and in extraordinarily short time, from any raw material containing tannin, however low grade or impure the raw material may be; and thus my invention constitutes a great improvement in the art.

I have found that the acetates of propyl, butyl and amyl either separately or in mixture with each other will extract from impure tannins or extracts such as sumac, dividivi and myrobolans, or from the vegetable raw materials used for the production of tannin, pure tannin, leaving the greatest part of the foreign bodies, usually contained in those materials, undissolved. For practical and commercial reasons I prefer the use of acetate of amyl. The solution which is thus obtained is only very slightly colored, and contains a very small amount of impurities, which are also soluble in acetate of amyl. To separate these bodies from the pure tannin, I may precipitate the acetate of amyl solution by the addition of bisulfide of carbon, chloroform, benzene, toluene, benzin, or other organic solvents, which do not dissolve tannin, which are, however, miscible with acetate of amyl. In this manner tannin in a very pure state is separated, whereas the impurities remain in solution. The precipitated tannin may be separated by filtration and freed from the adhering solvent by drying. Since tannin is very soluble in water, it may also be separated from the accompanying impurities in the solution of acetate of amyl by shaking the latter with water. From the pure watery solution tannin may then be separated in the manner well known in the art.

The tannin obtained by this process generally contains some gallic acid, which may be removed after the well known processes of the art. For example, the dried tannin may be redissolved in several times its weight of water, by which means the gallic acid remains almost completely undissolved, the watery solution of tannin being treated as usual.

The acetates of propyl, butyl and amyl to be used as solvents may be the pure commercial article, or may contain some water or other impurities usually occurring in commercial products of this kind.

It is obvious that, after methods practiced in the art, by distillation, &c., the solvent may be recovered almost quantatively after the tannin has been separated out, and may be repeatedly used.

If solid vegetable raw materials containing tannin, such as sumac, myrobolans, nut galls, &c., are used for the production of tannin, they are reduced into a fine powder and extracted in the usual manner with a sufficient quantity of acetate of amyl.

If liquid extracts are used the liquids are treated directly with the solvent.

The digestion may be carried out at ordinary temperature, or the temperature may be raised to 100° centigrade or even above. Too high a temperature, however, causes a dark coloration of the obtained solution. It is most advantageous to digest at 50° to 70° centigrade.

The obtained solution may be filtered or drawn off after undissolved impurities have settled.

In carrying out my process practically, I proceed, as follows: Fifty pounds of commercial sumac extract are treated with fifty pounds or more of acetate of amyl. After standing for some hours at a temperature of 50° to 70° centigrade, with occasional stirring, the liquid is filtered and benzin is added to the filtrate until a sample does not show any further precipitation on addition of benzin. The separated tannin is filtered and dried. In this manner I produce, in a very short time, almost chemically pure tannin from such impure raw materials as sumac, &c.

The quantity of acetate of amyl may, of course, be varied; but when using smaller quantities sticky liquids are obtained which can only be filtered with difficulty.

When in the claims of this specification I refer to acetate of amyl, I mean thereby to refer also to the acetates of propyl or butyl, or mixtures of the same with each other, or with acetate of amyl.

What I claim as my invention, and desire to secure by Letters Patent, is—

1. The process of producing tannin by treating raw materials containing the same with the acetate of amyl, thereby dissolving the tannin and separating the same from foreign bodies and subsequently separating the tannin from its solvents, substantially as described.

2. The process of producing tannin by treating raw materials containing the same with acetate of amyl, thereby dissolving the tannin and separating the same from foreign bodies, and subsequently separating the tannin from its solvents by the addition of benzin or other organic solvents, substantially as described.

In testimony whereof I have signed my name to this specification in the presence of two subscribing witnesses.

HUGO SCHWEITZER.

Witnesses:
H. CONTANT,
ANTHONY GREF.